E. I. DODDS.
APPARATUS FOR TESTING CASTINGS.
APPLICATION FILED FEB. 11, 1910.
1,096,158.
Patented May 12, 1914.
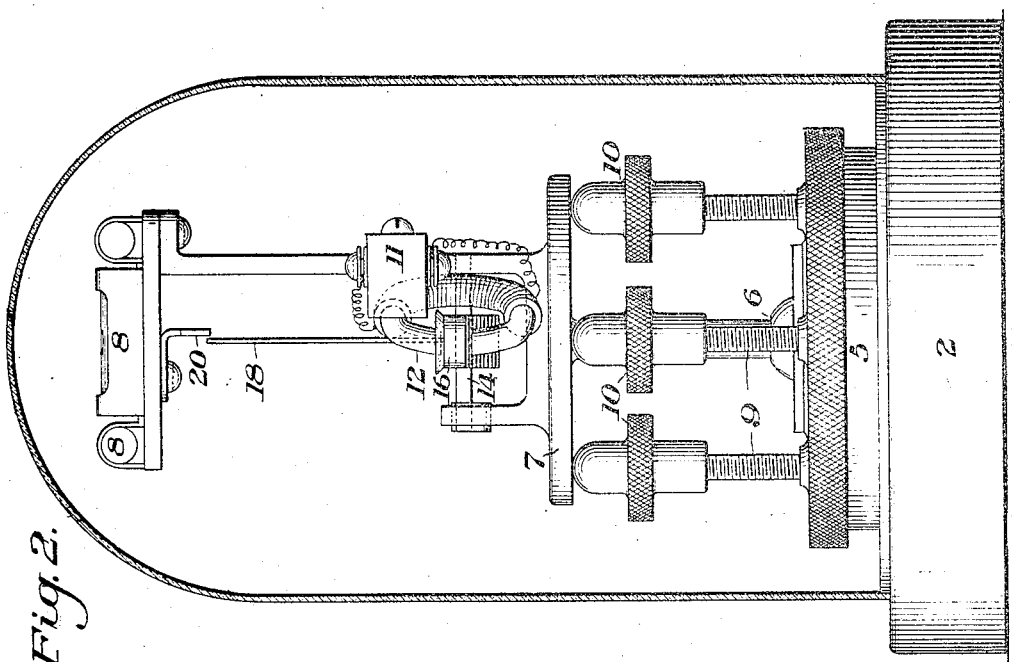
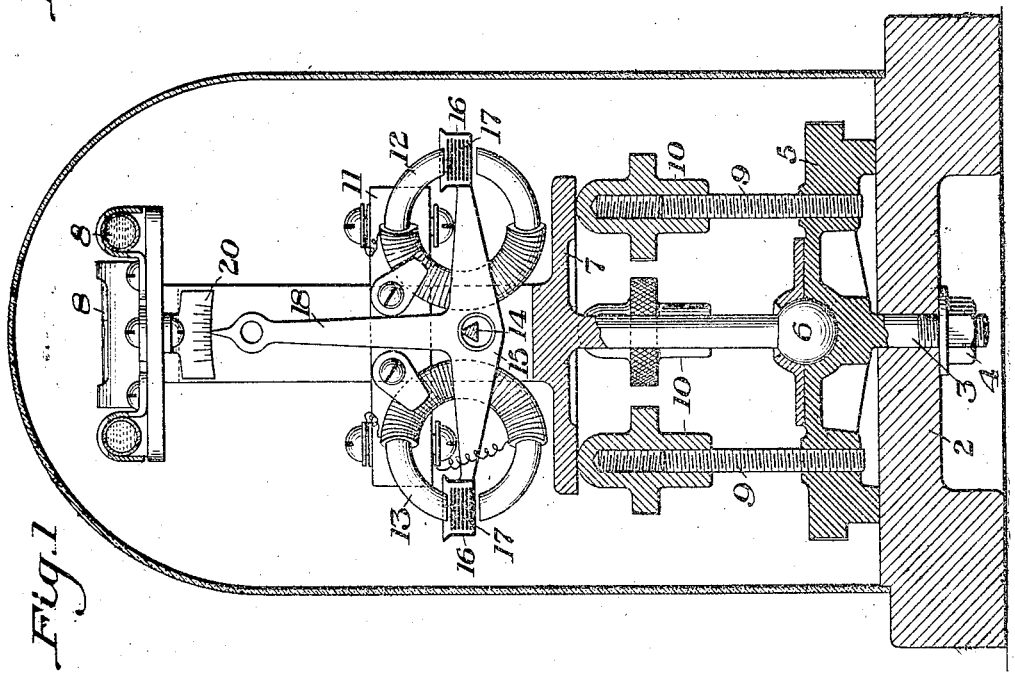
WITNESSES
INVENTOR

UNITED STATES PATENT OFFICE.

ETHAN I. DODDS, OF CENTRAL VALLEY, NEW YORK.

APPARATUS FOR TESTING CASTINGS.

1,096,158.

Specification of Letters Patent. Patented May 12, 1914.

Application filed February 11, 1910. Serial No. 543,375.

*To all whom it may concern:*

Be it known that I, ETHAN I. DODDS, of Central Valley, in the county of Orange and State of New York, have invented a new Improvement in Apparatus for Testing Castings, of which the following is a full, clear, and exact description, reference being had to the accompanying drawings, forming part of this specification, in which—
Figure 1 is a front view partially in section of one form of indicating apparatus; Fig. 2 is a side view of the same with the casing in section.

This invention relates to an apparatus for testing castings and is designed to provide a simple and reliable indicating apparatus to be used in conjunction with a testing apparatus for testing castings of iron or steel or other metal pieces of magnetic material.
The object of my invention is, to provide a simple and reliable indicating device for use in indicating the relative strengths of two different magnetic fields. This device is particularly adapted for use in a method of testing castings and the like in which relatively separated portions of the test pieces are simultaneously caused to form parts of two separate magnetic circuits and the inductive effects produced thereby are compared, the device constituting means for indicating the like or unlike extent of such effects.

The precise nature of my invention will be best understood by reference to the accompanying drawings, which will now be described, it being premised, however, that various changes may be made in the details of construction and arrangement of parts without departing from the spirit and scope of my invention, as defined in the appended claims.

In the accompanying drawings, the numeral 2 designates the base of the indicating apparatus. Secured to this base by means of the screw 3 and nut 4, is a bed plate 5. Pivotally connected to this bed plate 5 by means of a ball and socket joint 6, is a frame 7; and connected to the upper end of this frame 7 is a series of spirit levels 8, which are adapted to indicate when the frame has been adjusted to a perfectly level position. This frame 7 may be adjusted by means of the adjusting screws 9 and their nuts 10. Secured to a transverse member 11 of the frame 7 are two electromagnets 12 and 13. Pivotally mounted on the bearing 14 is an armature lever 15, which is provided with arms extending in line with each other. The outer ends of this armature lever are provided with the cups 16 arranged to receive the magnetic armature disks 17. The armature lever 15 has an upwardly extending arm 18, whose outer end is provided with a pointer arranged to travel over a scale 20. Each of the magnets 12 and 13 has an energizing coil. These coils are respectively connected to the testing apparatus in connection with which the instrument is more particularly designed to be used. So long as the effective ampere turns in the coils of each magnet remain the same, the poles of the two magnets adjacent to the armature disks 17 will be of like magnetic strength, and will therefore attract and hold the same number of disks, thereby holding the armature lever in a central position. If, however, by reason of variation in the current traversing these coils, one magnet becomes stronger than the other that magnet will attract and hold a greater number of armature disks than the other one, thereby unbalancing the armature lever 15 and causing the pointer 18 to have a corresponding movement on the scale 20. Variations in the relative strength of the currents flowing through the two coils will thus be indicated by movement of the pointer 18 either to the right or to the left from a central position, as the case may be.

The advantages of my invention result from the provision of an indicating device, which is extremely sensitive in character, and by means of which relatively small electric currents can be readily compared.

I claim:

1. In a differential indicating instrument for testing castings or other metal pieces a plurality of electromagnets and a pivoted armature lever, the ends of the armature lever extending between the poles of the electromagnets, a plurality of removable armature disks supported on the ends of the armature lever and arranged to be moved with relation to said armature lever, and an indicating device extending from the armature lever and co-acting with a stationary scale; substantially as described.

2. In a differential indicating instrument for testing castings or other metal pieces, a plurality of electromagnets and a pivoted armature between said magnets, the ends of the armature lever being situated between the poles of the electromagnets, cups on the ends of the armature lever, and a plurality of armature disks supported in said cups and arranged to be moved with relation to said cups; substantially as described.

In testimony whereof, I have hereunto set my hand.

ETHAN I. DODDS.

Witnesses:
R. A. BALDERSON,
H. M. CORWIN.